(12) United States Patent
Zohar et al.

(10) Patent No.: US 8,949,366 B2
(45) Date of Patent: Feb. 3, 2015

(54) SYSTEM, A METHOD, AND A COMPUTER PROGRAM PRODUCT FOR COMPUTER COMMUNICATION

(75) Inventors: Eyal Zohar, Shimshit (IL); Ofir Amir, Binyamina (IL)

(73) Assignee: Allot Communications Ltd., Hod-Hasharon (IL)

( * ) Notice: Subject to any disclaimer, the term of this patent is extended or adjusted under 35 U.S.C. 154(b) by 444 days.

(21) Appl. No.: 13/505,746

(22) PCT Filed: Nov. 3, 2010

(86) PCT No.: PCT/IB2010/054976
§ 371 (c)(1),
(2), (4) Date: Jul. 22, 2012

(87) PCT Pub. No.: WO2011/055310
PCT Pub. Date: May 12, 2011

(65) Prior Publication Data
US 2012/0278424 A1    Nov. 1, 2012

Related U.S. Application Data

(60) Provisional application No. 61/259,221, filed on Nov. 9, 2009.

(51) Int. Cl.
*G06F 15/167* (2006.01)
*H04L 29/08* (2006.01)
*H04L 29/06* (2006.01)

(52) U.S. Cl.
CPC ............. *H04L 67/2852* (2013.01); *H04L 69/22* (2013.01)
USPC ........................................................ 709/213

(58) Field of Classification Search
CPC ..................... H04L 41/509; H04L 67/2842
USPC ..................... 709/213–219; 711/118–144
See application file for complete search history.

(56) References Cited

U.S. PATENT DOCUMENTS

| | | | | |
|---|---|---|---|---|
| 6,823,372 | B1 * | 11/2004 | Kreiner et al. | 709/218 |
| 8,805,837 | B2 * | 8/2014 | Law et al. | 707/737 |
| 2001/0051927 | A1 * | 12/2001 | London et al. | 705/51 |
| 2003/0028519 | A1 * | 2/2003 | Burgess | 707/1 |
| 2005/0050067 | A1 * | 3/2005 | Sollicito et al. | 707/100 |
| 2008/0177861 | A1 * | 7/2008 | Basani et al. | 709/218 |
| 2008/0201331 | A1 * | 8/2008 | Eriksen et al. | 707/10 |
| 2010/0325363 | A1 * | 12/2010 | Olesen et al. | 711/135 |
| 2011/0099152 | A1 * | 4/2011 | Law et al. | 707/689 |
| 2012/0278424 | A1 * | 11/2012 | Zohar et al. | 709/213 |

\* cited by examiner

*Primary Examiner* — Brendan Higa
(74) *Attorney, Agent, or Firm* — Oren Reches

(57) ABSTRACT

A system, a method and a computer program product for transmission over a network, the method includes: receiving, by an intermediate system coupled to the network, a portion of a data structure that is aimed to a recipient computer; generating a stamp that is responsive to a content of a segment of the data structure and is indifferent to transfer information about a transmission of the data structure; wherein the portion may include the segment or equals the segment; determining, by the intermediate system, whether to cache the portion, in response to at least a comparison between the stamp and stamps of cached portions of data structures; selectively caching the portion in response to the determination; and transmitting to the recipient computer either one of the portion of the transmitted data structure and a cached version of the portion of the transmitted data structure.

40 Claims, 10 Drawing Sheets

SYSTEM, A METHOD, AND A COMPUTER PROGRAM PRODUCT FOR COMPUTER COMMUNICATION

RELATED APPLICATIONS

This application claims priority from U.S. provisional patent Ser. No. 61/259,221 filing date Nov. 9, 2009 which is incorporated herein by reference.

BACKGROUND

There is a growing need to efficiently transfer data structures, especially when such data structures are frequency transmitted over the network.

SUMMARY

According to an embodiment of the invention a method for transmission over a network may be provided. The method may include receiving, by an intermediate system coupled to the network, a portion of a data structure that is aimed to a recipient computer; generating a stamp that is responsive to a content of a segment of the data structure and is indifferent to transfer information about a transmission of the data structure; wherein the portion of the data structure either comprises the segment of the data structure or equals the segment of the data structure; determining, by the intermediate system, whether to cache the portion of the data structure, in response to at least a comparison between the stamp and stamps of cached portions of data structures; selectively caching the portion of the data structure in response to the determination; and transmitting to the recipient computer either one of the portion of the transmitted data structure and a cached version of the portion of the transmitted data structure.

The method may include generating the stamp while ignoring a name of the data structure.

The method may include generating the stamp while ignoring a communication protocol header of the transmission data structure.

The method may include selecting the segment of the data structure based on an expected location of at least one of a communication protocol header and a communication protocol trailer.

The method may include searching in a cache module for stamps of cached portions of data structures, wherein the searching is responsive to size information about a size of the data structure and to size information about cached data structures.

The method may include generating the stamp regardless of a size of the data structure.

The method may include selecting multiple segments of the data structure; generating, for each of the multiple segments of the data structure, a stamp that is responsive to a content of the segment of the data structure and is indifferent to transfer information about a transmission of the data structure; wherein the portion of the data structure either comprises the multiple segments of the data structure; determining, by the intermediate system, whether to cache the portion of the data structure, in response to at least a comparison between the multiple stamps and stamps of cached segments of data structures; and selectively caching the portion of the data structure in response to the determination.

The determining whether to cache the portion of the data structure may be responsive to a frequency of requests to download the data structures.

The determining whether to cache the portion of the data structure may be responsive to at least one out of (a) a cost of transmission of the data structure from a source of the data structure and (b) a speed of transmission of the data structure from the source of the data structure.

The method may include transmitting to the recipient computer the portion of the data structure from the source of the data structure and transmitting to the recipient computer a cached version of another portion of the transmitted data structure.

The method may include blocking a transmission of the data structure from a source of the data structure after an initialization of a transmission of a cached version of the portion of the data structure to the recipient computer.

The method may include allowing an exchange of control messages between the recipient computer and the source while blocking a transmission of the data structure.

According to various embodiments of the invention a computer program product may be provided. It may include a non-transient computer readable medium that stores instructions for: receiving, by an intermediate system coupled to the network, a portion of a data structure that is aimed to a recipient computer; generating a stamp that is responsive to a content of a segment of the data structure and is indifferent to transfer information about a transmission of the data structure; wherein the portion of the data structure either comprises the segment of the data structure or equals the segment of the data structure; determining, by the intermediate system, whether to cache the portion of the data structure, in response to at least a comparison between the stamp and stamps of cached portions of data structures; selectively caching the portion of the data structure in response to the determination; and transmitting to the recipient computer either one of the portion of the transmitted data structure and a cached version of the portion of the transmitted data structure.

The non-transient computer readable medium may store instructions for generating the stamp while ignoring a name of the data structure.

The non-transient computer readable medium may store instructions for generating the stamp while ignoring a communication protocol header of the transmission data structure.

The non-transient computer readable medium may store instructions for selecting the segment of the data structure based on an expected location of at least one of a communication protocol header and a communication protocol trailer.

The non-transient computer readable medium may store instructions for searching in a cache module for stamps of cached portions of data structures, wherein the searching is responsive to size information about a size of the data structure and to size information about cached data structures.

The non-transient computer readable medium may store instructions for generating the stamp regardless of a size of the data structure.

The non-transient computer readable medium may store instructions for selecting multiple segments of the data structure; generating, for each of the multiple segments of the data structure, a stamp that is responsive to a content of the segment of the data structure and is indifferent to transfer information about a transmission of the data structure; wherein the portion of the data structure either comprises the multiple segments of the data structure;

determining, by the intermediate system, whether to cache the portion of the data structure, in response to at least a comparison between the multiple stamps and stamps of cached segments of data structures; and selectively caching the portion of the data structure in response to the determination.

The non-transient computer readable medium may store instructions for determining whether to cache the portion of the data structure in response to a frequency of requests to download the data structures.

The non-transient computer readable medium may store instructions for determining whether to cache the portion of the data structure in response to at least one out of (a) a cost of transmission of the data structure from a source of the data structure and (b) a speed of transmission of the data structure from the source of the data structure.

The non-transient computer readable medium may store instructions for transmitting to the recipient computer the portion of the data structure from the source of the data structure and transmitting to the recipient computer a cached version of another portion of the transmitted data structure.

The non-transient computer readable medium may store instructions for blocking a transmission of the data structure from a source of the data structure after an initialization of a transmission of a cached version of the portion of the data structure to the recipient computer.

The non-transient computer readable medium may store instructions for allowing an exchange of control messages between the recipient computer and the source while blocking a transmission of the data structure.

According to an embodiment of the invention an intermediate system is provided. It is coupled to a network that couples a source of a data structure and a recipient computer. The intermediate system may include a memory unit; a control sub-system that is arranged to: receive a portion of a data structure that is aimed to a recipient computer, generate a stamp that is responsive to a content of a segment of the data structure and is indifferent to transfer information about a transmission of the data structure; wherein the portion of the data structure either comprises the segment of the data structure or equals the segment of the data structure; determine, by the intermediate system, whether to cache the portion of the data structure in the memory unit, in response to at least a comparison between the stamp and stamps of cached portions of data structures; selectively cache (either cache or not), in the memory unit, the portion of the data structure in response to the determination; and transmit to the recipient computer either one of the portion of the transmitted data structure and a cached version of the portion of the transmitted data structure.

The control sub-system may be arranged to generate the stamp while ignoring a name of the data structure.

The control sub-system may be arranged to generate the stamp while ignoring a communication protocol header of the transmission data structure.

The control sub-system may be arranged to select the segment of the data structure based on an expected location of at least one of a communication protocol header and a communication protocol trailer.

The control sub-system may be arranged to search in the memory unit for stamps of cached portions of data structures, wherein the searching is responsive to size information about a size of the data structure and to size information about cached data structures.

The control sub-system may be arranged to generate the stamp regardless of a size of the data structure.

The control sub-system may be arranged to: select multiple segments of the data structure; generate, for each of the multiple segments of the data structure, a stamp that is responsive to a content of the segment of the data structure and is indifferent to transfer information about a transmission of the data structure; wherein the portion of the data structure either comprises the multiple segments of the data structure; determine, by the intermediate system, whether to cache the portion of the data structure, in response to at least a comparison between the multiple stamps and stamps of cached segments of data structures; and selectively cache the portion of the data structure in response to the determination.

The control sub-system may be arranged to determine whether to cache the portion of the data structure is responsive to a frequency of requests to download the data structures.

The control sub-system may be arranged to determine whether to cache the portion of the data structure is responsive to at least one out of (a) a cost of transmission of the data structure from a source of the data structure and (b) a speed of transmission of the data structure from the source of the data structure.

The control sub-system may be arranged to transmit to the recipient computer the portion of the data structure from the source of the data structure and transmit to the recipient computer a cached version of another portion of the transmitted data structure.

The control sub-system may be arranged to block a transmission of the data structure from a source of the data structure after an initialization of a transmission of a cached version of the portion of the data structure to the recipient computer.

The control sub-system may be arranged to allow an exchange of control messages between the recipient computer and the source while blocking a transmission of the data structure.

According to an embodiment of the invention a system that includes multiple intermediate entities is provided. The intermediate entities can be those illustrated above. Each intermediate entity may include a memory unit; a control sub-system that is arranged to: receive a portion of a data structure that is aimed to a recipient computer, generate a stamp that is responsive to a content of a segment of the data structure and is indifferent to transfer information about a transmission of the data structure; wherein the portion of the data structure either comprises the segment of the data structure or equals the segment of the data structure; determine whether to cache the portion of the data structure in a memory unit of a selected intermediate entity of the multiple intermediate entities, in response to at least a comparison between the stamp and stamps of cached portions of data structures; participate in a caching, in the memory unit of the selected intermediate entity, the portion of the data structure in response to the determination; and transmit to the recipient computer either one of the portion of the transmitted data structure and a cached version of the portion of the transmitted data structure, if the selected intermediate unit is the intermediate unit that comprises the control sub-system.

Each intermediate entity may include control sub-system is arranged to transmit to the recipient computer either one of the portion of the transmitted data structure and a cached version of the portion of the transmitted data structure, regardless of a routing of traffic from an origin server to the recipient computer.

BRIEF DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements

DETAILED DESCRIPTION OF THE DRAWINGS

Figure 1:
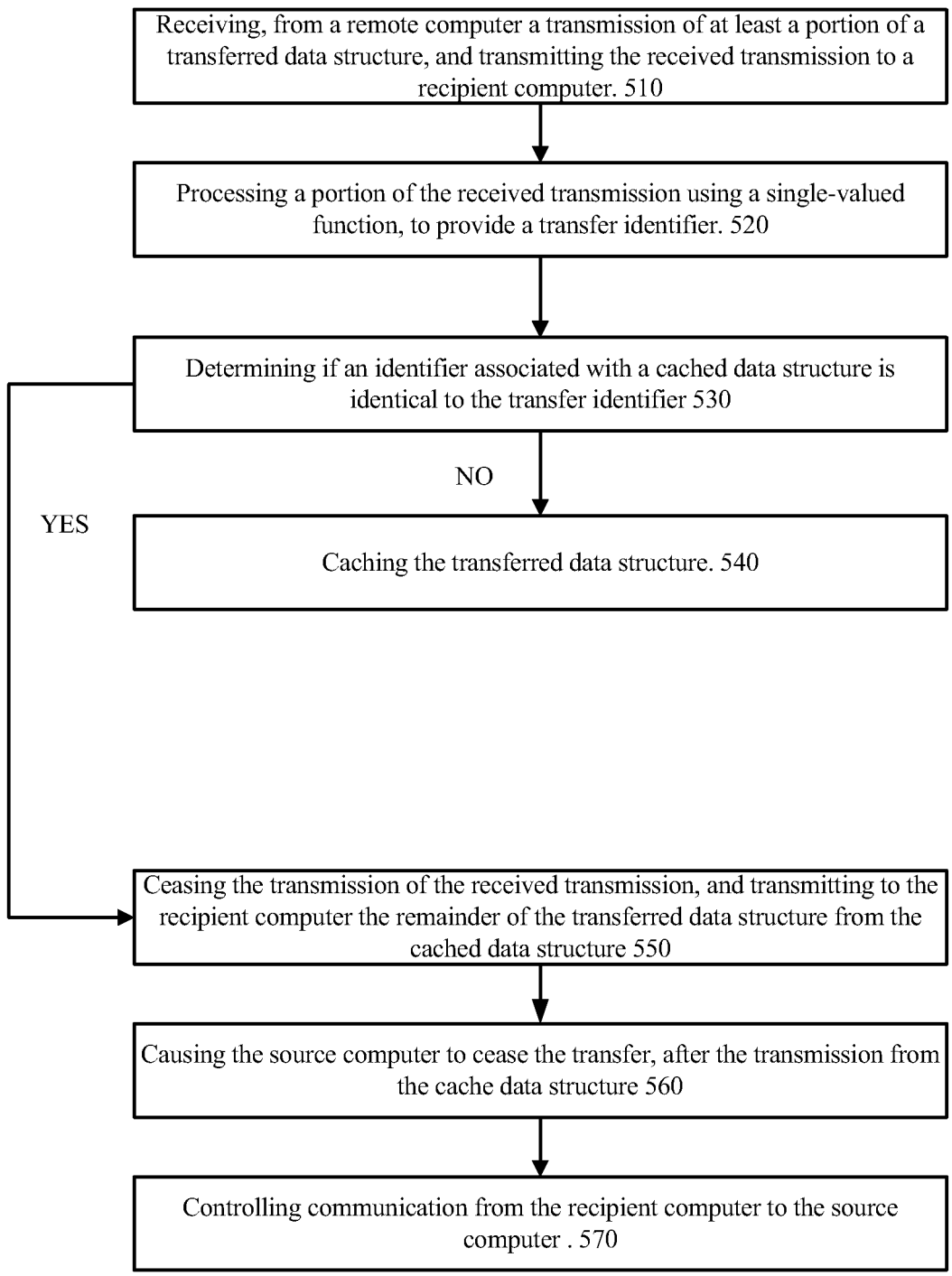
FIG. 1 illustrates a method according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

FIG. 1 illustrates method 500 for computer communication, according to an embodiment of the invention.

Method 500 may be implemented by one or more systems such as data structure server, data structure caches, video servers, video caches, etc. At least one of the one or more systems which participate in method 500 is an intermediary system, which transfers information from a source such as a remote computer (which may act as a source of a transmission of a data structure) to a recipient computer (which may be a computer of a web-user, or other recipient computer in a computer network). For example, the intermediary system may be a system of an internet service provider, seeking to ease the bandwidth load on its transmission channels, as well as to keep up to guaranteed transmission speed assured to its clients. The remote computer is referred to as a source because is transmits the data structure.

Stage 510 includes receiving from a remote computer a transmission of at least a portion of a transferred data structure, and transmitting the received transmission to a recipient computer. It is noted that the transferred data structure (or data structures, as method 500 may usually be applied to a large number of data structures) may be of many different types. By way of example, the transferred data structure may be a video data structure (streaming or not), other media data structure (streaming or not), program installation data structure, a text data structure, a data structure of raw data, a file and so forth.

It is noted that stage 510 may include receiving and transmitting a TCP transmission (wherein method 500 may be used to look for large HTTP sessions and to use cached information to stand for at least a part of the transmission from the source computer).

In many embodiments of which, method 500 may be especially effective for relatively large data structures (e.g. larger than one megabyte), and for data structures which are frequently transferred over the network (e.g. videos from video hosting sites). As will be discussed below, method 500 may also be especially effective for transferred data structures of which a large portion is frequently transferred, but not necessarily the entire data structure (e.g. common data structures to which unique headers may be added by different sources—e.g. different video hosting sites). It is however noted that method 500 may be implemented for any types of data structures, and that different embodiments of which may be more or less effective for other types of data structures as well.

Stage 520 includes processing a portion of the received transmission using a single-valued function, to provide a transfer identifier (which may also be referred to as a signature of the transferred data structure, or as a stamp of which). It is noted that stage 520 is usually carried out during stage 510—that is, while the at least a portion of the transmitted data structure is still received and transmitted further to the recipient computer.

The processing may include processing of several packets of the transferred data structure, and generating the stamp accordingly. By way of example, the size of the generated stamp according to an embodiment of the invention is about 5000 bytes. It is noted that different embodiments of the invention may utilize different sizes of stamps. Furthermore, it is not necessary that the stamps of the different data structures transferred will all be of a single size. Additionally, as will be discussed below, according to an embodiment of the invention, each data structure may be associated with more than one stamp, wherein the size of the different stamps associated with each data structure may be different.

According to an embodiment of the invention, the processing which leads to the determining of the transfer identifier (stamp) may be further responsive to other identifying information of the transferred data structure, such as the size of which. According to another embodiment of the invention, such additional identifying information of the transferred data structure may use for identification of the transferred data structure, but not be used for the generating of the stamp.

It is however noted that conveniently, stage 520 may include utilizing only data structure information of the transferred data structure which is transmitted, and not additional information not relating to the transferred data structure. Especially, in such embodiments of the invention, the processing of stage 520 would not be responsive to the source of the data structure (e.g. by URL parsing, and so forth), to a destination of the data structure, and so forth. Additionally, the generation of the stamp does not require any knowledge pertaining to the content of the data structure. E.g. it may be indifferent to whether the transferred data structure is a software installation data structure, or a streaming video.

However, according to an embodiment of the invention, stage 520 may be preceded by selecting the portion of the received transmission which will be processed, in response to the type of the transferred data structure. It is noted that different types of data structures may include different headers, which are not identical in each transfer—even though the content of the data structure may be identical. For example, the header may include the name of the data structure, details of the source, details pertaining to the transmission, and so forth. Therefore, the processing of stage 520 may be preceded by selecting a portion of the received transmission that does not include the header of the data structure. Two situations in which this may be desirable are: skipping large headers that may repeat on different data structures (e.g. a short video portion of the storing web-site), and skipping fields that may change even when the data structure itself remains intact.

It should be noted that in some situation, an intermediate system may not only be indifferent to the content of such header, but may also choose not to store header information. For example, the header of the data structure may include a portion which is essential for the decoding or decrypting of the data structure. If the intermediate system does not store that header portion which is essential for the decoding or the decrypting of the data structure, it may store data structures-content which is not decipherable or decodable (but rather a useless albeit frequently transferred bulk of information). In some situations this may be a desired effect. It is further noted that a header portion may be relatively large—e.g. one hundred kilobytes in MPEG4 data structures is not excessive.

It is noted that the selecting of the portion to be processed may include, according to various embodiments of the invention, selecting a portion within a predetermined length from the beginning of the data structure (e.g. after a header-length which depends on the type of the transmitted data structure), or selecting a portion within a predetermined length from the end of the transmitted data structure.

The former is useful, for example, for generation of a "main stamp" which characterizes the transmitted data structure in its entirety (or almost entirety, bar the header), while the latter option may be useful, for example, for identification of portion of the transferred data structure that does not include the beginning of the data structure (e.g. if a ceased download of a data structure is reinitiated, the beginning of the data structure may not be transmitted, the beginning of the data structure may be received from another source—e.g. in P2P networks, a streaming video transferred may start from a user-selected point in time, and so forth).

According to an embodiment of the invention, stage 520 may include generating a series of transfer identifier (also referred to as "slices", or intermediate stamps), from portion located in reselected locations in relation to an end of the transferred data structure. For example—such intermediate stamps may be generated for portions located in equal distances of half a megabyte from the end of the data structure. Such a series may be generated on-top of a main stamp that is respective to the beginning of the transferred data structure, or instead of such main stamp. It is noted that in some embodiments of the invention, main stamp is generated only for relatively small data structures (e.g. smaller than one megabyte).

Stage 530 of method 500 includes determining if an identifier associated with a cached data structure is identical to the transfer identifier. The determining of stage 530 may be useful for determining if a copy of at least a portion of the transferred data structure (or at least of the remainder of which) is cached in an accessible memory storage. It is noted that the transferred data structure (and at least the remaining portion) may usually be required to be identified in very high probability (so that a transmission of which may not be replaced by other non-related data structure because of false-identification). Therefore, according to an embodiment of the invention, stage 530 may further include determining if multiple identifiers which are associated with a cached data structures are identical to multiple transfer identifiers of the transferred data structure (e.g. two slices at correct locations, or a main stamp and a slice).

Other parameter which may also be used is the size of the transferred data structure. For example, some sites that put the same opening on every movie may have the same stamp for all the data structures, but still we found that data structure size in these cases is good enough for uniqueness, and especially when the average data structure size is large (e.g. if only main stamp is implemented).

It is noted that it is may be not desirable to store too large stamps (which may require implementing of additional factors such as data structure size). According to experiments and mathematical evaluation that is based on the number of movies in the Internet today, a data structure stamp of 5,000 bytes may be sufficient, for such implementations. However, it is noted that both smaller (and even significantly smaller) and larger (even significantly larger) stamps may be implemented. Too large stamps may have negative effect on future integration with routing equipment, CPU usage and cache hit-ratio (minor effect).

It is however noted that the identifying of a matching cache data structure (if exists) in response to the at least one transfer identifier (and possibly also to the data structure size) is usually carried out irrespectively of factors that are not related to the data structure transmitted (e.g. source URL, recipient, and so forth).

Once it has been determined whether a matching cached data structure exists or not, method 500 may continue accordingly. For example, two options which may be implemented are: (a) Listen-and-save (download)—The data structure is not found in cache, therefore it will be saved to the cache for the first time—or at least will be used for updating of another cached data structure, if it will turn out that a continuation of the data structure is cached, and (b) Cut-and-serve (upload)—if the matching cached data structure exists in the cache, the connection with the server may be terminated and the recipient computer will get the rest of the data structure from a caching system (possibly without the recipient computer knowing it).

Stage 540 (which may be carried out if a matching cached data structure have not been identified) includes caching the transferred data structure (or at least a portion of which, e.g. from the point from which reception started, or from when caching was decided upon) for further use. Caching of data structures may include storing of a predetermined transfer identifier as an identifier associated with the newly cached data structure (e.g. if a main stamp was determine), and may also include generating of new identifier (e.g. as the transmission continues), and associating the newly created identifier with the newly cached data structure.

It is noted that the decision to cache the transferred data structure may further depend on other factors as well, such as the size of the data structure, the frequency the data structure is transmitted (e.g. by comparing to a database of stamps collected over a period of time), and so forth. This decision, unlike the aforementioned limitation which may be implemented in the identification of the data structure, may also depend on frequent sources of the data structure. For example, if the data structure is frequently received over a channel which is slow, or when the cost of such channel is high, it may be more advisable to cache it. The source of the transfer is however not necessary, not necessarily determined or identified, and the caching of data structures may be irrespective at all to the source or to the target of the transfer.

According to an embodiment of the invention, demand management can be performed, meaning that only important data structures will be saved after their main stamp is detected several times.

According to an embodiment of the invention, partial downloads (or transmission) can also be saved, to later match with other overlapping parts and build a complete data structure, or at least until its end (start can be "jump", only reducing the efficiency of the specific data structure). It is noted that in embodiment with limited space and demand management, it may be more efficient to start with part data structures (to end), and save more parts when the demand grows. In the mean time users will get cache service only for the part that is already in cache.

Also, it should be noted that according to an embodiment of the invention, caching of the transferred data structure may be carried out (and connection with the source server can remain open) even if the recipient computer (client) wants to terminate it. In that case the a connection with the client may be reset, and the recipient computer may be prevented from opening a new one using the same port, until the download completes.

Stage 550 (which may be carried out if a matching cached data structure have been identified) includes ceasing the transmission of the received transmission, and transmitting to the recipient computer the remainder of the transferred data structure (or at least a portion of which) from the cached data structure. It is noted that the transition from the external source to the cached information may conveniently be transparent to the recipient computer. It is noted that in some situation, only a portion of the remainder is transmitted from the cached data structure, and afterwards the method continues with switching back to transferring data structure received from the source (e.g. if only a middle part of the data structure is cached). In some situations, such interchanges may be carried out more than once during the transmission of the data structure.

Stage 550 may include impersonating as the source computer (e.g. transmitting to the client computer messages/data other than the cached data structure, responding to client's queries, and so forth). E.g. usually the source IP remains the same as when the session started (spoofing).

It is noted that the transmitting of the cached data structure to the client can start at any point in time (after stamp verification), meaning, by way of example, that the client can get a significant part of the data structure from the origin server, and only then switch to the cache. This increasing the flexibility of the method (and enables adjustments to the implementing system's needs.)

It is noted that, according to an embodiment of the invention, only data structures that are stored in cache until their end can be uploaded. However, this is not necessarily so.

According to various embodiments of the invention, the transmission speed of the cached data structure may be selected from one or more of the following:
i. Unlimited, according to user connection type.
ii. Globally limited according to data structure type, origin, etc.
iii. With movies or other streaming media it can be a factor of the required speed for smooth playback.
iv. Reflection of what was seen when the user downloaded from the origin. It may require a delay in service, to measure the speed, but in some sites it may be very needed (Rapid-Share Free Account for example).

According to an embodiment of the invention, method 500 may further include stage 560 of causing the source computer to cease the transfer, after the transmission to transmission from the cached data structure. This may be done, for example, either by instructing the source computer to do so, or by blocking ACKs from the client.

According to an embodiment of the invention, method 500 may further include stage 570 of controlling communication from the recipient computer to the source computer. This may include blocking of certain messages (such as acknowledgments of proper receptions—also known as ACKs), but also by utilizing information provided by the client (e.g. SYN messages of the client may include Maximum Segment Size (MMS) information, which should be used when transmitting to the client the cache data structure portion.

It is noted that in some embodiments of the invention, some messages from the client to the source computer (or to other computer) are not blocked. For example, some video players of video content hosts transmits indication of progression of the watching, which are not related to the transmission of the data structure to the user (e.g. even when the video is streamed from another server). Such messages are not necessarily blocked.

As will be discussed below, according to an embodiment of the invention, the controlling of the communication from the recipient computer to the source computer may be carried out by a system other than the one which controls the communication from the source computer to the recipient (e.g. if the method is implemented by an internet service provider—ISP—many a time the upload communication of subscribers is channeled via channels different than the channels used from download traffic. According to an embodiment of the invention, the method further include transmission of information from one or more "control systems" to one or more "first control systems" (as discussed above), and vice versa. Example for such sharing of information is offered below.

Some of the reasons because of which controlling upload communication form the client to the source computer (or other computers associated with which) are:
i. User SYN contains MSS factor.
ii. User ACK is required for flow control, including retransmissions.
iii. User ACK should not be sent to the server during upload, because of the storm and/or retransmissions it may generate.
iv. Server RST or retransmissions must be stopped, so the client will continue to download.

It is noted that method 500 (or at least some of its stages) may be implemented by one or more computer readable medium having computer readable code embodied therein, the computer readable code includes instructions for carrying out of one or more stages of method 500 (e.g. by one or more of the sub-systems of system 100).

Figure 2:
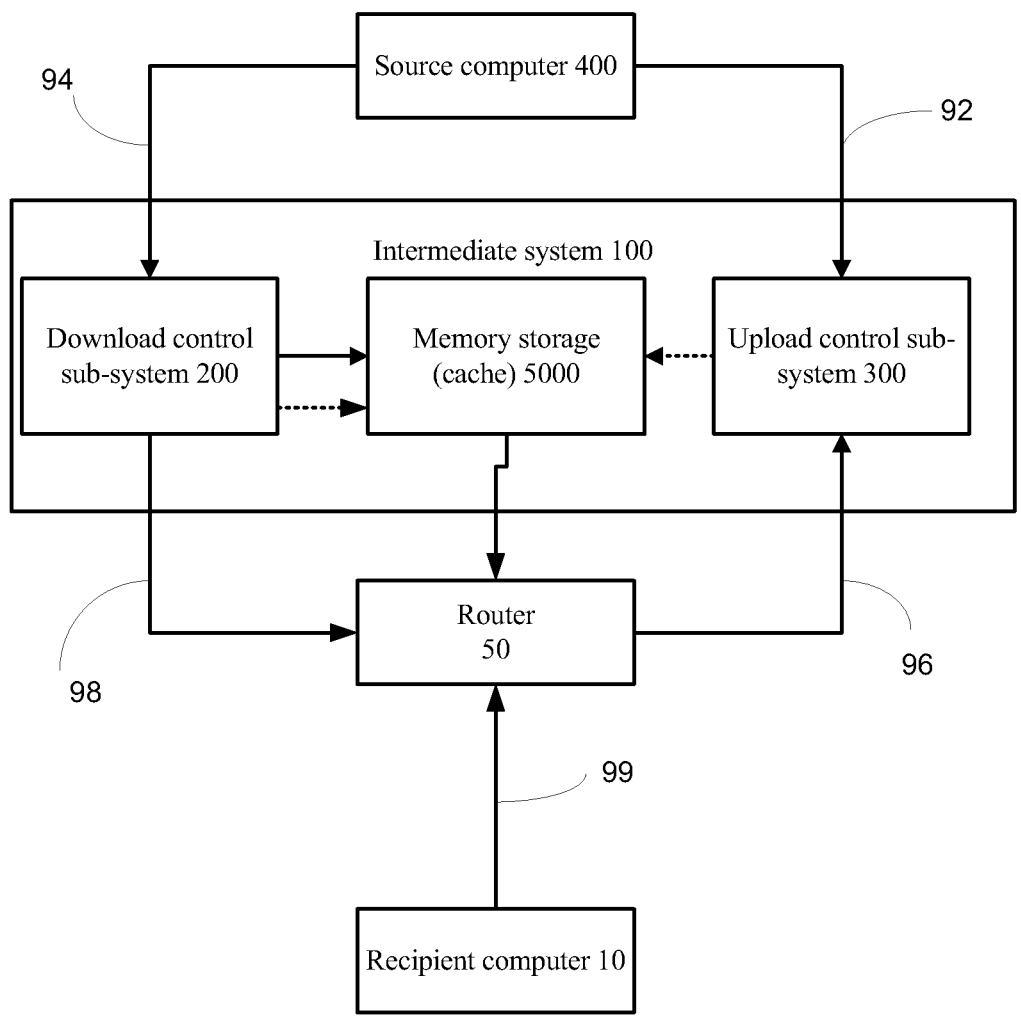
FIG. 2 illustrates a method according to an embodiment of the invention.

FIG. 2 illustrates a method for method 600 for transmission over a network, according to an embodiment of the invention.

Figure 4:
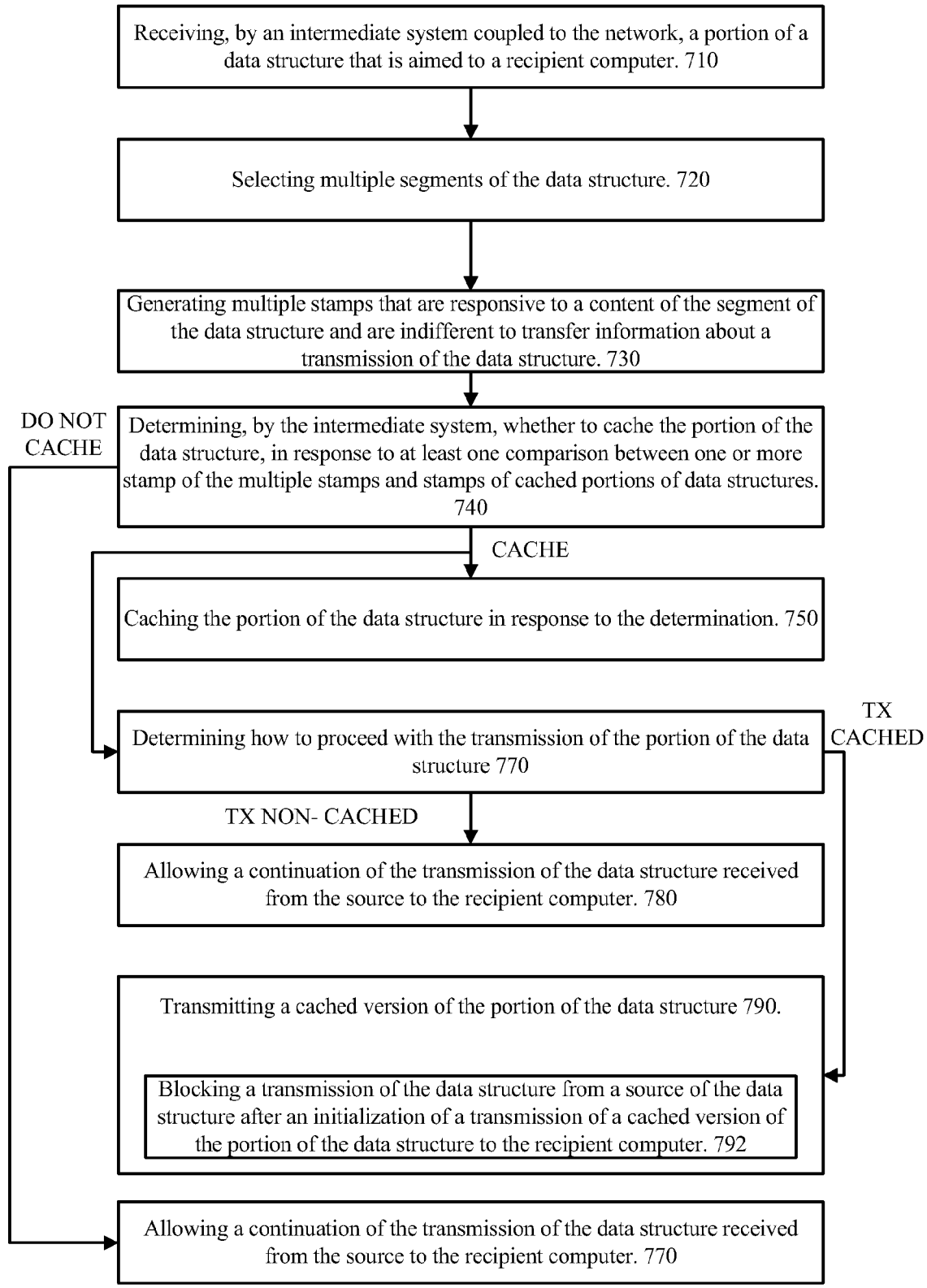
FIG. 4 illustrates a method according to an embodiment of the invention.

It is noted that each one of FIGS. 1, 2 and 4 may show or otherwise refer to stages that follow each other. It is noted that the order of these stages can differ from the order illustrated in these figures. If is further noted these stages can be executed in parallel to each other, in a non-overlapping or overlapping manner and the like. Thus, for example, various stages such as stages 620, 630, 640 and 650 can be executed while the data structure or a portion thereof is being received (stage 610). Yet for another example, a data structure or a portion of the data structure can be cached while the data structure or a portion thereof is being cached.

Method 600 starts by stage 610 of receiving, by an intermediate system coupled to the network, a portion of a data structure that is aimed to a recipient computer. Referring to the example set forth in FIG. 2, the network is illustrated by links 92, 94, 96, 98 and 99 and the intermediate system is denoted 100.

Stage 610 is followed by stage 620 of selecting a segment of the data structure. The segment can be included in the portion and can even be the portion itself.

Stage 620 is followed by stage 630 of generating a stamp that is responsive to a content of the segment of the data structure and is indifferent to transfer information about a transmission of the data structure. Thus, the segment is not expected to include transfer information or if it includes such transfer information the stamp is generated such as to ignore such information.

Stage 630 is followed by stage 640 of determining, by the intermediate system, whether to cache the portion of the data structure, in response to at least a comparison between the stamp and stamps of cached portions of data structures.

Stage 640 may include determining whether to cache the portion of the data structure is responsive to a frequency of requests to download the data structures. Thus more frequently requested data structures shall be cached. For example a portion of a data structure will be cached if the data structure or this exact portion is requested more than a predefined threshold. This predefined threshold can be updated (reset) each period of time.

The determining of stage 640 of whether to cache the portion of the data structure is responsive to at least one out of (a) a cost of transmission of the data structure from a source of the data structure and (b) a speed of transmission of the data structure from the source of the data structure. If the transmission from the source is more costly (more expensive) there can be a tendency to cache the portion of the data structure. The same applies if the transmission is slow.

If determining to cache the portion then stage 640 is followed by stage 650 of caching the portion of the data structure in response to the determination. Stage 650 is followed by stage 660.

If determining to not to cache the portion of the data structure then stage 640 is followed by stage 660 of allowing a continuation of the transmission of the data structure received from the source to the recipient computer. Thus, the intermediate system may not interfere with the transmission of the data structure.

If determining to cache the portion of the data structure stage 640 can be followed by stage 670 of determining how to proceed with the transmission of the portion of the data structure—either by allowing the transmission from the source (and in this case stage 670 is followed by stage 680) or by transmitting a cached version of the portion of the data structure (and in this case stage 670 is followed by stage 690).

Thus, stages 680 and 690 facilitate a transmission, to the recipient computer, either one of the portion of the transmitted data structure and a cached version of the portion of the transmitted data structure (if such a cached version exists).

Stage 680 includes allowing a continuation of the transmission of the data structure received from the source to the recipient computer. Thus, the intermediate system may not interfere with the transmission of the data structure.

Stage 690 includes transmitting to the recipient computer a cached version of the portion of the transmitted data structure.

Stage 690 may include stage 692 of blocking a transmission of the data structure from a source of the data structure after an initialization of a transmission of a cached version of the portion of the data structure to the recipient computer. Stage 692 may include allowing an exchange of control messages between the recipient computer and the source while blocking a transmission of the data structure. These control messages can include, for example acknowledgements.

It is noted that the mentioned above stages can be repeated multiple times for different portions of the data structure. In this case different portions of the data structure can be treated in the same manner or can be treated differently. Thus, one or more portion can be cached while another portion will not be cached. One portion of the data structure will be transmitted from the source while a transmission of another portion will be stopped and a cached version of the other portion of the data structure will be sent from the memory unit.

Stage 630 may include at least one of the following: (a) generating the stamp while ignoring a name of the data structure, (b) generating the stamp while ignoring a communication protocol header of the transmission data structure; (c) generating the stamp regardless of a size of the data structure.

Stage 620 may include selecting the segment of the data structure based on an expected location of at least one of a communication protocol header and a communication protocol trailer. Thus—the segment can be selected such as to start at a predetermined distance from the beginning or the end of the data structure (or the beginning or end of the portion of the data structure).

Stage 640 may include searching in a cache module for stamps of cached portions of data structures. The searching is followed by comparing between the stamps of the cached portions and the stamp of the segment of the data structure.

According to an embodiment of the invention the searching can be responsive to size information about a size of the data structure and to size information about cached data structures.

Using the size information the system can increase its robustness as not to serve different data structures with different data structure size if this data structures generate the same stamp (due to the fact that these data structures share the same data in the beginning used for stamp generation) size information can be ignored where it is determined that such conditions does not apply in a specific case.

Method 600 can be applied on multiple segments of the data structure so that a caching and/or transmission decision is based on stamps of all or most of the segments of the data structure. This is illustrated in FIG. 4.

FIG. 4 illustrates a method 700 for transmission over a network, according to an embodiment of the invention.

Method 700 starts by stage 710 of receiving, by an intermediate system coupled to the network, a portion of a data structure that is aimed to a recipient computer.

Stage 710 is followed by stage 720 of selecting multiple segments of the data structure. The segments can be included in the portion and can form the portion itself.

Stage 720 is followed by stage 730 of generating multiple stamps that are responsive to a content of the segment of the data structure and are indifferent to transfer information about a transmission of the data structure. Thus, each segment is not expected to include transfer information or if it includes such transfer information the corresponding stamp of this portion stamp is generated such as to ignore such information.

Stage 730 is followed by stage 740 of determining, by the intermediate system, whether to cache the portion of the data structure, in response to at least one comparison between one or more stamp of the multiple stamps and stamps of cached portions of data structures.

This determination can be responsive to comparisons relating to all stamps or a portion thereof (majority based decision or other decisions that take into account the comparison of one or more stamps). An exact match of all stamps can be required—but this is not necessarily so.

Stage 740 of determining whether to cache the portion of the data structure can be responsive to a frequency of requests to download the data structures. Thus—more frequently requested data structures shall be cached. For example—a portion of a data structure will be cached if the data structure or this exact portion is requested more than a predefined threshold. This predefined threshold can be updated (reset) each period of time.

The determining of stage 740 of whether to cache the portion of the data structure is responsive to at least one out of (a) a cost of transmission of the data structure from a source of the data structure and (b) a speed of transmission of the data structure from the source of the data structure. If the transmission from the source is more costly (more expensive) there can be a tendency to cache the portion of the data structure. The same applies if the transmission is slow.

If determining to cache the portion then stage 740 is followed by stage 750 of caching the portion of the data structure in response to the determination. Stage 750 is followed by stage 760.

If determining to not to cache the portion of the data structure then stage 740 is followed by stage 760 of allowing a continuation of the transmission of the data structure received from the source to the recipient computer. Thus, the intermediate system may not interfere with the transmission of the data structure.

If determining to cache the portion of the data structure stage 740 can be followed by stage 770 of determining how to proceed with the transmission of the portion of the data structure—either by allowing the transmission from the source (and in this case stage 770 is followed by stage 780) or by transmitting a cached version of the portion of the data structure (and in this case stage 770 is followed by stage 790).

Thus, stages 780 and 790 facilitate a transmission, to the recipient computer, either one of the portion of the transmitted data structure and a cached version of the portion of the transmitted data structure (if such a cached version exists).

Figure 3:
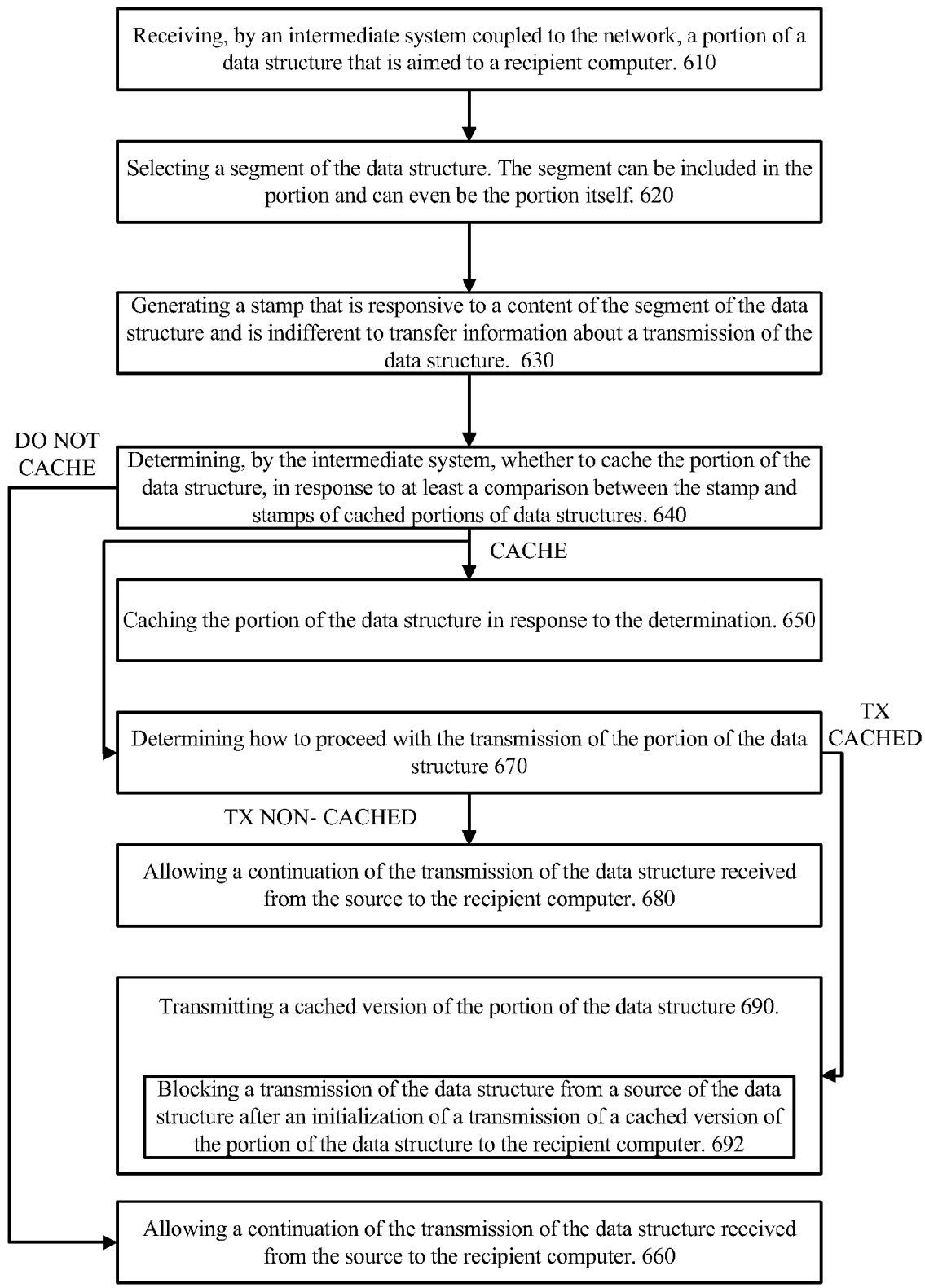
FIG. 3 illustrates an intermediate system and its environment according to an embodiment of the invention.

FIG. 3 illustrates system 100 for controlling computer communication, according to an embodiment of the invention. System 100 includes a second control sub-system 200, and may also include first control sub-system 300.

System 100 further includes memory storage 5000, which may be part of a control sub-system such as a second control sub-system 200, or a first control sub-system 300, or independent from both. It is noted that several memory storages 5000 may be used by a single download and/or first control sub-system. It is also noted that conveniently, system 100 may include multiple second control sub-systems 200, and/or multiple first control sub-systems 300. Usually, each client 10 is served by a single first control sub-system 300 (and possibly also by a single second control sub-system 200), but this is not necessarily so.

It is noted that second control sub-system 200 and first control sub-system 300 (and possibly also memory storage 5000) may be implemented as distinct systems which are located at different geographical location. It is further noted that a first control sub-system 300 of a first system 100 may communicate with a second control sub-system 200 of a second system 100.

System 100 is connected to various components such as source computer 400, router 50 via a network. The router 50 can be connected to the recipient computer 10 via a network. The network is illustrated by links 92, 94, 96, 98 and 99. The router 50 of FIG. 2 can be regarded as part of the network or a part of the intermediate system 100.

Conveniently, system 100 can implement method 500, 600 and/or 700 as discussed above, and it is noted that different embodiments of method 500, 600 and/or 700 may be incorporated into system 100 even if not explicitly elaborated, and vice versa.

Conveniently, second control sub-system 200 is configured to receiving from one or more remote computers a transmission of at least a portion of a transferred data structure, to transmit the received transmission to recipient computer 10, to process a portion of the received transmission using a single-valued function, to provide a transfer identifier, and to determine if an identifier associated with a cached data structure is identical to the transfer identifier.

The at least one storage memory 5000 is configured to selectively transmit to the recipient computer 10 the remainder of the transferred data structure from the cached data structure, while second control sub-system 200 ceases the transmission of the received transmission (conveniently substantially concurrently). Conveniently, storage memory 5000 does so in response to information received from second control sub-system 200 or from first control sub-system 300.

It is noted that storage memory 5000 is conveniently also adapted to cache at least a portion of the transferred data structure (usually if it not transfers the corresponding cached data structure).

According to an embodiment of the invention, first control sub-system 300 may cause the source computer 400 to cease the transfer, after the transmission to transmission from the cached data structure. First control sub-system 300 may also be adapted to control communication from recipient computer 10 to source computer 400, and/or to other computer—for example (but not necessarily), as disclosed below.

According to an embodiment of the invention, it is possible to use multiple systems 100 (or sub-systems of which) in order to serve clients that send their packets through one route and receive from another, e.g. as described below.

It is noted that transmission of the cached data structure can usually start at any moment after the stamp has been verified. Usually, the sooner is better, because more bytes will be delivered from cache, but it is not a must.

According to an embodiment of the invention, from the moment that transmission starts, all signals from the source computer (that can be an origin server) 400 should be blocked, otherwise the communication between the storage memory (cache) 5000 and the client 10 may be interrupted.

When the transmission from the cache is in progress, all signals from the client 10 to the source computer 400 may be blocked, but not necessarily so. Especially, some such signals may be allowed to go through (especially the first ACKs), as they only add an overhead (both directions) but cannot cut the cache-client connection.

According to an embodiment of the invention, the first control sub-system 300 need to accept client ACKs, or any other representation of them. Since that connection is relatively stable, it is expected to work well with another sub-system (e.g. sub-system 300) mirroring the ACKs (about blocking, see above). The mirroring sub-system may use a predictive deterministic algorithm, to save on synchronization signals with the cache 5000. According to an embodiment of the invention, such synchronizing signals may be transmitted between cache 5000 and first control sub-system 300.

It is noted that both the reception of the transferred data structure from source 400 (until it is possibly terminated), as well as the decision to switch to transferring the cached data structure (or portion of which), both depend only on down traffic.

The following process (or some stages of which) may be implemented (in system 100, and/or in method 500, 600 and/or 700):

Client sends SYN
The first control sub-system ignores it
Web server responds with SYN+ACK The second control sub-system puts the triplet (UserIP, ServerIP, ClientPort) in a connection list End user sends an HTTP request (may have multiple packets)

The first control sub-system puts the triplet (UserIP, ServerIP, ClientPort) in an HTTP connection list (it may also save any of host name, URL and byte range)

Web server may send empty ACKs

The second control sub-system ignores the empty ACKs

Web server responds with HTTP response header {may have multiple packets)

The second control sub-system performs an initial size analysis, to continue only with those that have the right content length Web server sends the data structure The second control sub-system collects the first 5,000 bytes The second control sub-system completes the stamp.

The second control sub-system asks #3 if it has the data structure by (stamp, length).

The storage memory server answers that it has the data structure.

The second control sub-system broadcasts a query to see who sees the up going traffic by (UserIP, ServerIP, ClientPort, stamp, length, start seq).

The first control sub-system answers that it sees the up going traffic.

The first control sub-system sends a reset message to the source computer, while possibly instructing the cache to start transmitting (alternatively second control sub-system may instruct the cache).

The second control sub-system blocks a reset message from the server to the client.

It should be noted that cached data structure which were cached by the herein disclosed system and method may also be used for other caching techniques (e.g. to prior art video caches), where the stamps are usually not used by such other systems.

It is further noted that not identifying the type of the data structure is useful, because of its robustness. While caching solutions which depends on identifying the source of the transferred data structures (e.g. URL) or which analyze the upload requests may be limited to only some types of transferred identified as problematic (e.g. video content), but may not cache unidentified large data structures which are commonly shared (e.g. census registration information).

Also, a single URL may provide different data structures at different times (e.g. different commercials out of a pool of few commercials), wherein the herein disclosed solution may enable identifying the few data structures are constantly transmitted—without being mislead by the single source.

Also, when a single data structure is offered by many sources under different names (e.g. in P2P scenarios), the herein disclosed solutions enable switching to the cached source in different points along the data structure—and are thus hardly influenced by different data structure names.

It is noted that storage memory 500 may utilized the cached data structures in additional ways, such as writing them to tangible medium such as compact disc, printing them, and so forth.

Figure 5:
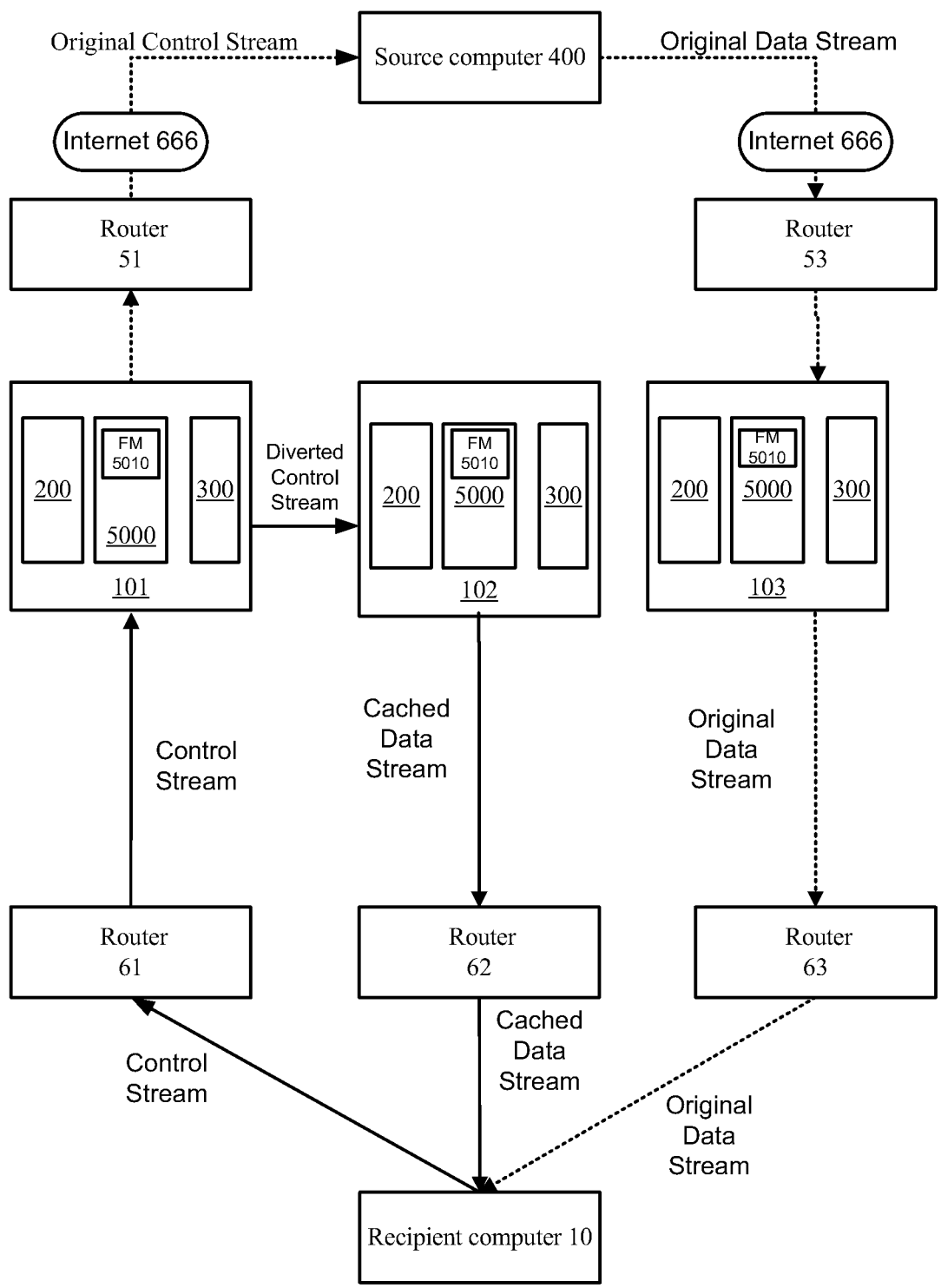
FIG. 5-9 illustrates systems according to various embodiments of the invention.
Figure 6:
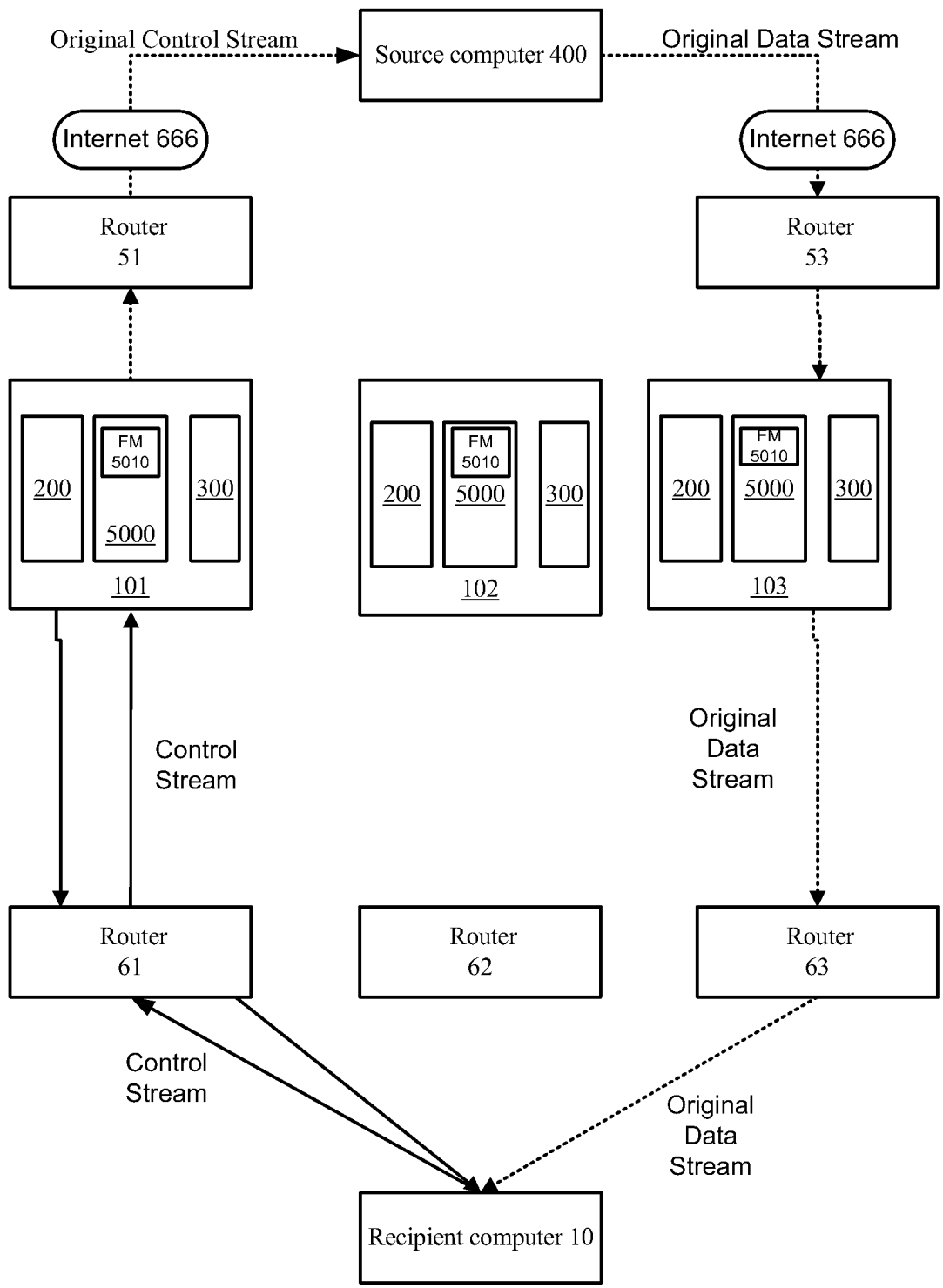
Figure 7:
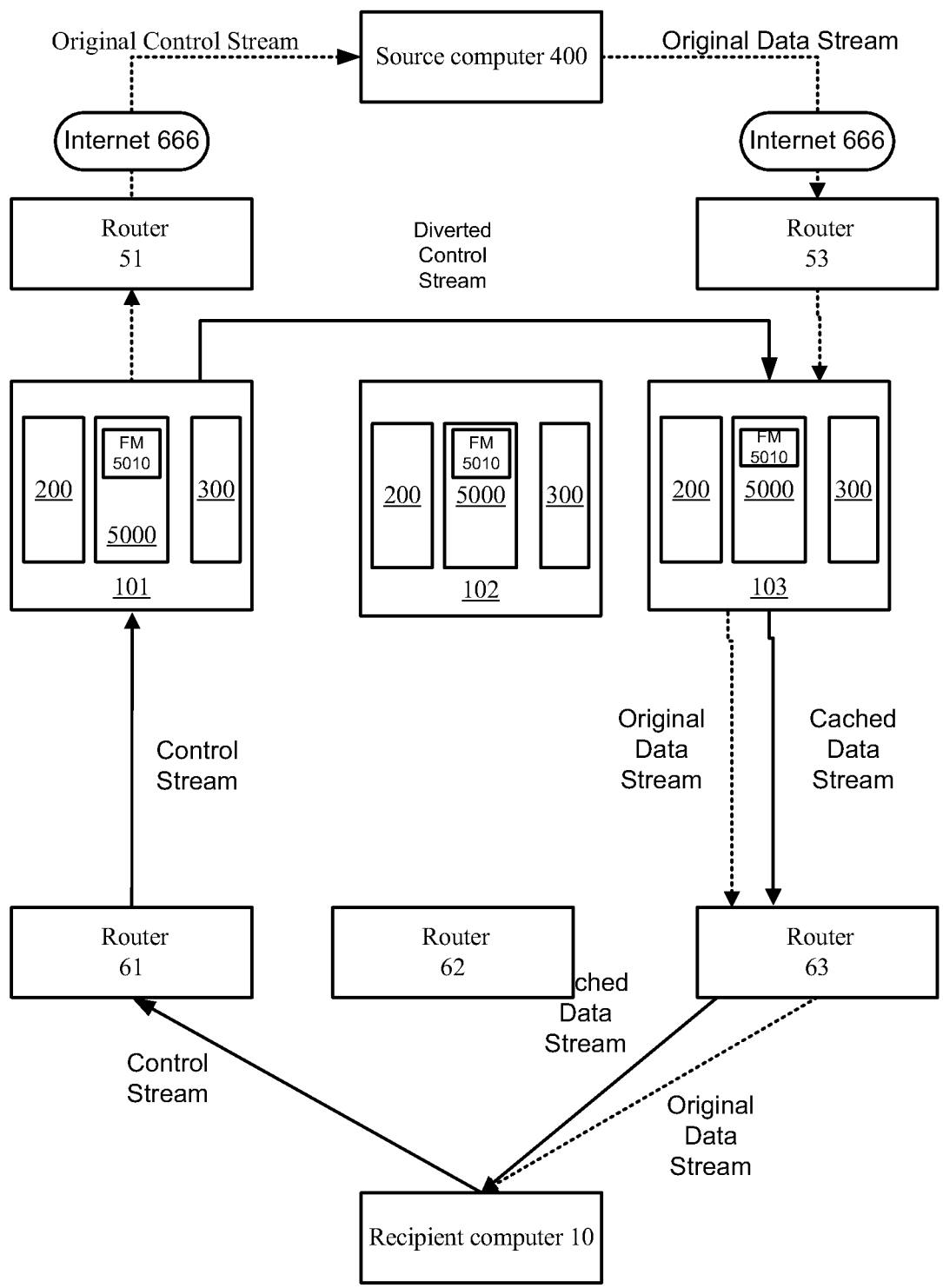

FIG. 5-7 illustrate multiple intermediate systems 101, 102 and 103 and their environment according to various embodiments of the invention.

Each of the first, second and third intermediate systems 101, 102 and 103 may resemble system 100 of FIG. 2. Each of the first, second and third intermediate systems can include a second control sub-system 200, memory storage 5000 and a first control sub-system 300.

The distributed configuration illustrated in FIGS. 5-7 can provide support in an A-symmetric network where the route of traffic from a data source to a destination is different than the route of the traffic from the data destination to the data source. This a-symmetry is characteristic of various networks such as but not limited to modern IP networks.

This distributed configuration can also over come bandwidth and memory limitations of a single intermediate system.

The intermediate systems can determine how to provide a cached data structure or a portion thereof regardless of the manner than non-cached traffic is provided to the recipient controller.

The first, second and third intermediate systems 101, 102 and 103 may reside in different location in the network, and each can provide the following functionalities:

i. Data Selection function—detecting and selecting the data to be transmitted to the destination based on the generated stamp.

ii. Serving function—transmission of the actual cached data to the destination computer iii. Diversion function—diverting the control packets from the destination computer to the serving element instead of the source computer.

The first, second and third intermediate systems 101, 102 and 103 can provide one or more of these mentioned above functions, depending on the actual routes and cache data location. For example, a selection function can be provided by an intermediate system that is located on the traffic route from the source to the destination. Yet for another example, the diversion function can be provided by an intermediate system that is located on the traffic route from the destination to the source. Yet for a further example, the serving function can be provided by an intermediate system that maybe located anywhere in the network with route to the destination.

It is noted that either one of the intermediate systems 101, 102 and 103 may provide any one or more of these functionalities, depending on the actual data routes and the distribution of the cached data between the different elements. The data data structures can be stored in the cache module of one or more intermediate systems. A data structure manages (5010) can determine in which intermediate system a requested data structure is stored and may direct control stream to that intermediate system that in turn will send the requested data data structure to the recipient computer. The data structure manager 5010 is illustrated as being included in the cache module 500 of each intermediate system but this is not necessarily so. A data structure manager 5010 can be located outside the intermediate systems and/or can be shared by multiple intermediate systems. A data data structure can be hashed (or otherwise processed) to provide a signature that may indicate where the data structure is stored. The data structure manager can store a mapping between signature values and cache modules and determine where a requested data structure is stored.

FIG. 5 illustrates an example in which the first intermediate system 101 determines that the cached data stream should be provided by the second intermediate system 102 (that stores the requested data structure) and diverts the control stream to the second intermediate system 101. FIG. 5 also illustrates the path of the original data structure—it is provided via the internet 666 to router 53, third intermediate system 103 and via router 63 to the recipient computer. It is noted that the request to receive a data structure (or a portion thereof) can start by providing the original data structure (or a portion thereof) and then can be replaced by providing the cached data structure (or a portion thereof). Thus, this solution does not delay the provision of data can be regarded almost an out of band solution.

FIG. 6 illustrates an example in which the first intermediate system 101 receives the control stream and provides the cached data structure (or a portion thereof). The third intermediate system 103 can provide the original data structure.

FIG. 7 illustrates an example in which the first intermediate system 101 determines that the cached data stream should be provided by the third intermediate system 103 and diverts the control stream to the third intermediate system 103. FIG. 7 also illustrates the path of the original data structure—it is provided via the internet 666 to router 53, third intermediate system 103 and via router 63 to the recipient computer. It is noted that the request to receive a data structure (or a portion thereof) can start by providing the original data structure (or a portion thereof) and then can be replaced by providing the cached data structure (or a portion thereof). Thus, this solution does not delay the provision of data can be regarded almost an out of band solution.

The first till third intermediate systems 101-103 may provide the functionality of selection of the intermediate system (out of 101-103) that shall participate in the transmittal of data to the recipient computer. The selection can be responsive to the location of the data structure (in which cache module 5000 of the intermediate systems 101-103 the data structure is stored) depending of the actual routes (from the source to the destination, from the destination to the source) and the element storing the cached data.

Each intermediate system (or a dedicated unit) can apply a control function that can detect the actual routes according to the source and destination network address's (available to the selection function) and routing information collected from the network over time (e.g. using BGP protocol monitoring, or dedicated routing reflector function, existing in IP networks).

The selection of the intermediate system that will store (or that is already storing) the cached data can be done using a directory function, periodically querying all on the available cached data in the intermediate systems and its stamp, or by a static allocation of content according to its stamp (using a static hush function mapping from stamps to element ID).

The selection function can decide whether the data should be served from the cached version according to different parameters among them: data size (above/below some limit), data identification (URI) and remote/Destination computer address.

As mentioned above the intermediate systems can operate as a selection element (thereby applying a selection function), as a serving element (thereby applying a serving function), as a diverting element (thereby applying a diversion function) and a central cache control function (thereby applying a cache control function). These intermediate systems can co-operate in the following manner:
 i. The selection/detection element monitor the traffic passing through it and extracting "stamps" to each data segment it detects (same process as before).
 ii. Upon such a stamp the element query the control element on the existence and location of the cached data fitting this stamp
 iii. The control element can locate the element that can provide the data, and determine the diverting element which the (control) traffic from the destination to the remote computer passes through.
 iv. The control element can instruct the serving element to get ready to send data to the destination computer (with stream initialization information—sequence, TCP window, etc.)
 v. The control element can instruct the diverting element to start diverting the control stream from the remote computer to the serving element
 vi. The serving element, upon receiving both the control element instruction and information, and receiving the stream control data from the diverting element, can start sending the data from the correct place as extracted from the control data (TCP window location)
 vii. The control element can instruct the Selection/detection element to disconnect the stream from the remote computer.
 viii. The selection/detection element can send reset command (spoofing the data using the client IP Address, as if it arrived from the destination computer).
 ix. The selection/detection element can block all data from this time, from the remote computer to the destination computer.

Figure 10:
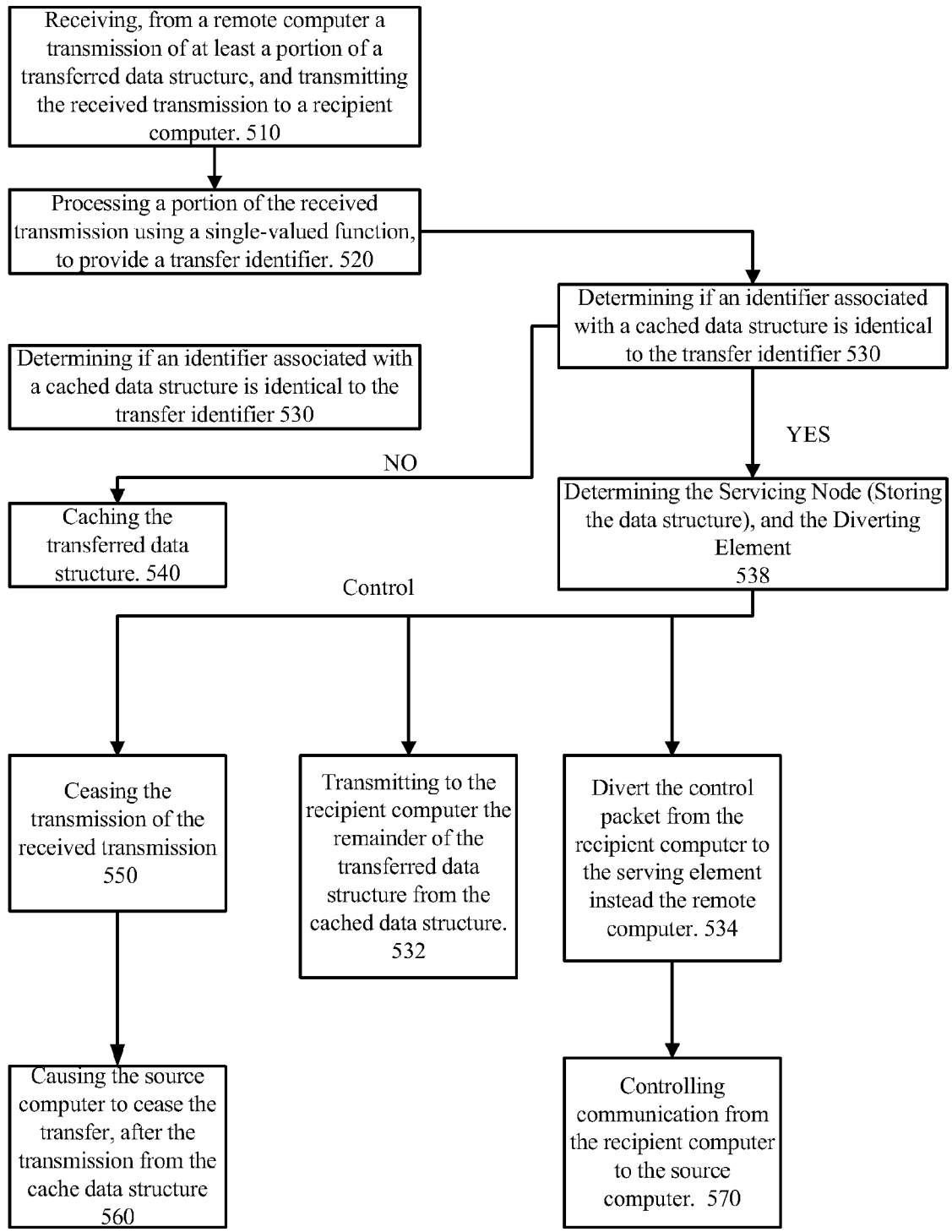
FIG. 10 illustrates a method according to an embodiment of the invention.

FIG. 10 illustrates a method 600 according to an embodiment of the invention.

Method 600 may differ from method 500 of FIG. 1 by (a) including stages 532, 534 and 538, and (b) executing various stages of the method by various intermediate systems. For example, (b.1) stages 510, 520, 530, 540, 550 and 560 can be executed by an intermediate system that applies a selection function, (b.2) stage 532 can be executed by an intermediate system that applies a serving function, (b.3) stages 534 and 570 can be executed by an intermediate system that provides diverting function, and (b.4) stages 530 and 538 can be executed by an intermediate system that applies a central cache control.

Method 600 starts by stage 510. Stage 510 is followed by stage 520. Stage 520 is followed by stage 530. Stage 530 is followed (if the answer is "NO") by stage 540, else it is followed by stage 538. Stage 528 is followed by stages 550, 532 and 534. Stage 534 is followed by stage 570. Stage 530 is followed by stage 560.

Figure 8:
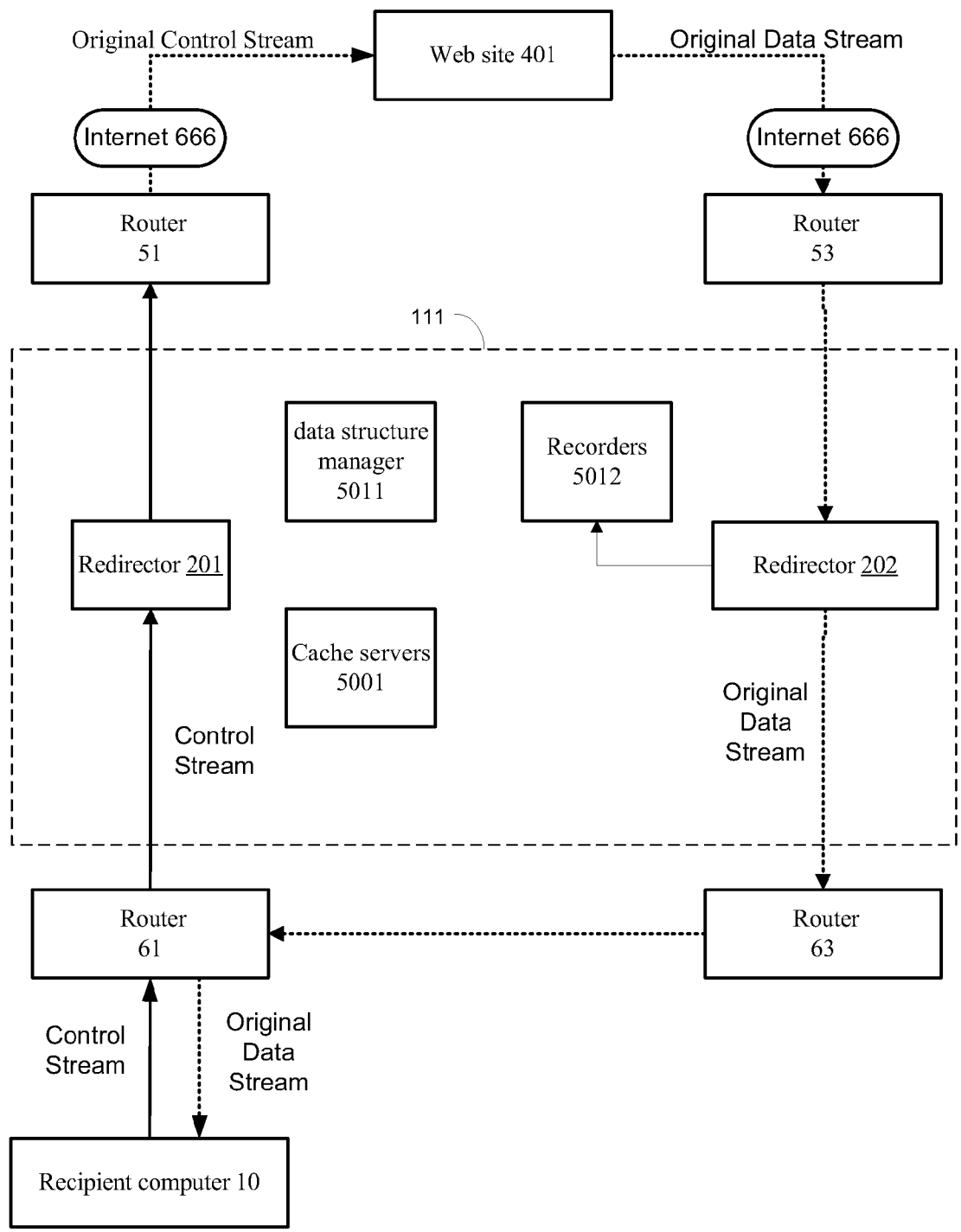
Figure 9:
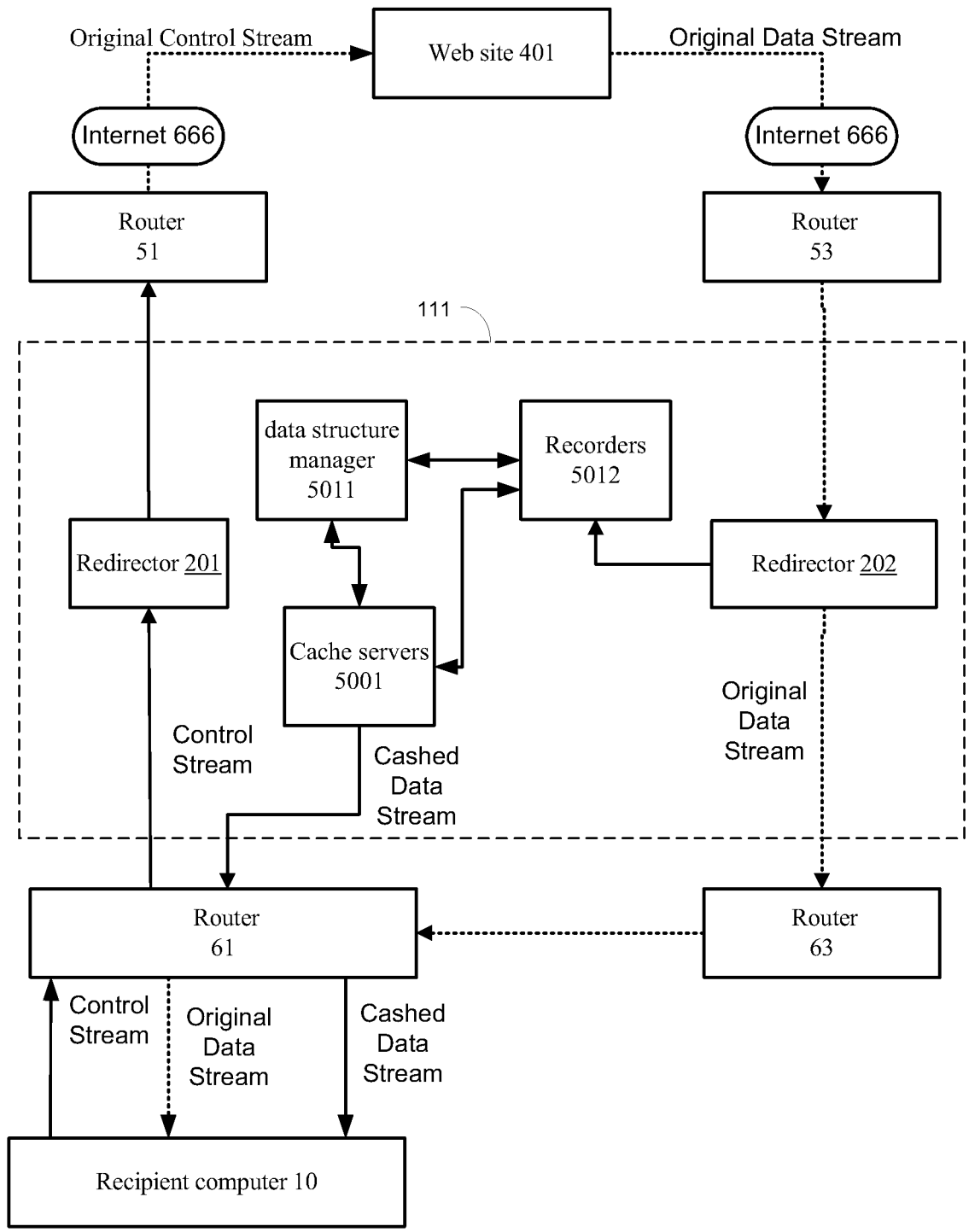

FIGS. 8 and 9 illustrate an intermediate system 111 and its environment according to an embodiment of the invention.

The intermediate system 111 may include one or more out of intermediate systems 101, 102 and 103 of previous figures. FIGS. 8 and 9 illustrate the intermediate system 111 as including a data structure manager 5011, recorders 5012, re-directors 201 and 202 and cache servers 5001. Redirector 201 can be a part of the second control sub-system 200 of first intermediate system 101 of FIGS. 5-7. Redirector 202 and/or recorder 5012 can be a part of the first control sub-system 300 of third intermediate system 103 of FIGS. 5-7. Cache servers 5001 can implement the cache modules 5000 of one or more intermediate systems 101, 102 and 103 of FIGS. 5-7. Fila manager 5011 can be included within each of the data structure managers 5010 of FIGS. 5-7.

FIG. 8 illustrates an original data stream that is provided by redirector 202 and routers 53, 63 and 61 to the recipient computer—from the web site 401.

FIG. 9 illustrates various scenarios—the redirector 202 can send to the recorders 5012 (and to router 63) an original data structure, the recorders 5012 can send the data structure or a signature of the data structure (for example a hash value) to the data structure manager 5011 that may decide to (i) cache the data structure, (ii) provide a cached version of the data structure, (iii) not to cache or provide the data structure. The data structure manager 5011 can send instructions according to this determination to the recorders 5012, redirectors 202 and cache servers 5001.

It is noted that the redirector 201 can inform the data structure manager 5011 about the data structure it is requested to provide and that the data structure manager 5011 can starts a determination process in response to the received data.

In the claims, the word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for transmission over a network, the method comprises:
   receiving, by an intermediate system coupled to the network, a portion of a data structure that is aimed to a recipient computer;
   generating a stamp that is responsive to a content of a segment of the data structure and is indifferent to transfer information about a transmission of the data structure; wherein the portion of the data structure either comprises the segment of the data structure or equals the segment of the data structure;
   determining whether to cache the portion of the data structure, in response to at least a comparison between the stamp and stamps of cached portions of data structures;
   selectively caching the portion of the data structure in response to the determination; and
   transmitting to the recipient computer either one of the portion of the transmitted data structure and a cached version of the portion of the transmitted data structure.

2. The method according to claim 1, comprising generating the stamp while ignoring a name of the data structure.

3. The method according to claim 1, comprising generating the stamp while ignoring a communication protocol header of the transmission data structure.

4. The method according to claim 1, comprising selecting the segment of the data structure based on an expected location of at least one of a communication protocol header and a communication protocol trailer.

5. The method according to claim 1, comprising searching in a cache module for stamps of cached portions of data structures, wherein the searching is responsive to size information about a size of the data structure and to size information about cached data structures.

6. The method according to claim 5, comprising generating the stamp regardless of a size of the data structure.

7. The method according to claim 1, comprising:
   selecting multiple segments of the data structure;
   generating, for each of the multiple segments of the data structure, a stamp that is responsive to a content of the segment of the data structure and is indifferent to transfer information about a transmission of the data structure; wherein the portion of the data structure either comprises the multiple segments of the data structure;
   determining, by the intermediate system, whether to cache the portion of the data structure, in response to at least a comparison between the multiple stamps and stamps of cached segments of data structures; and
   selectively caching the portion of the data structure in response to the determination.

8. The method according to claim 1, wherein the determining whether to cache the portion of the data structure is responsive to a frequency of requests to download the data structures.

9. The method according to claim 1, wherein the determining whether to cache the portion of the data structure is responsive to at least one out of (a) a cost of transmission of the data structure from a source of the data structure and (b) a speed of transmission of the data structure from the source of the data structure.

10. The method according to claim 1, further comprising transmitting to the recipient computer the portion of the data structure from the source of the data structure and transmitting to the recipient computer a cached version of another portion of the transmitted data structure.

11. The method according to claim 1, further comprising blocking a transmission of the data structure from a source of the data structure after an initialization of a transmission of a cached version of the portion of the data structure to the recipient computer.

12. The method according to claim 11, further comprising allowing an exchange of control messages between the recipient computer and the source while blocking a transmission of the data structure.

13. The method according to claim 1, comprising determining, by another intermediate entity, whether to cache the portion of the data structure, in response to at least a comparison between the stamp and stamps of cached portions of data structures.

14. The method according to claim 1, wherein the receiving of the portion of the data, the generating of the stamp, the determining whether to cache the portion of the data structure, the selectively caching of the portion, and the transmitting to the recipient computer are executed by multiple intermediate entities.

15. A computer program product comprising a non-transient computer readable medium that stores instructions for:
   receiving, by an intermediate system coupled to the network, a portion of a data structure that is aimed to a recipient computer;
   generating a stamp that is responsive to a content of a segment of the data structure and is indifferent to transfer information about a transmission of the data structure; wherein the portion of the data structure either comprises the segment of the data structure or equals the segment of the data structure;
   determining whether to cache the portion of the data structure, in response to at least a comparison between the stamp and stamps of cached portions of data structures;
   selectively caching the portion of the data structure in response to the determination; and transmitting to the recipient computer either one of the portion of the transmitted data structure and a cached version of the portion of the transmitted data structure.

16. The computer program product according to claim 15, wherein the non-transient computer readable medium stores instructions for generating the stamp while ignoring a name of the data structure.

17. The computer program product according to claim 15, wherein the non-transient computer readable medium stores instructions for generating the stamp while ignoring a communication protocol header of the transmission data structure.

18. The computer program product according to claim 15, wherein the non-transient computer readable medium stores instructions for selecting the segment of the data structure based on an expected location of at least one of a communication protocol header and a communication protocol trailer.

19. The computer program product according to claim 15, wherein the non-transient computer readable medium stores instructions for searching in a cache module for stamps of cached portions of data structures, wherein the searching is responsive to size information about a size of the data structure and to size information about cached data structures.

20. The computer program product according to claim 19, wherein the non-transient computer readable medium stores instructions for generating the stamp regardless of a size of the data structure.

21. The computer program product according to claim 15, wherein the non-transient computer readable medium stores instructions for:
    selecting multiple segments of the data structure;
    generating, for each of the multiple segments of the data structure, a stamp that is responsive to a content of the segment of the data structure and is indifferent to transfer information about a transmission of the data structure; wherein the portion of the data structure either comprises the multiple segments of the data structure;
    determining, by the intermediate system, whether to cache the portion of the data structure, in response to at least a comparison between the multiple stamps and stamps of cached segments of data structures; and
    selectively caching the portion of the data structure in response to the determination.

22. The computer program product according to claim 15, wherein the non-transient computer readable medium stores instructions for determining whether to cache the portion of the data structure in response to a frequency of requests to download the data structures.

23. The computer program product according to claim 15, wherein the non-transient computer readable medium stores instructions for determining whether to cache the portion of the data structure in response to at least one out of (a) a cost of transmission of the data structure from a source of the data structure and (b) a speed of transmission of the data structure from the source of the data structure.

24. The computer program product according to claim 15, wherein the non-transient computer readable medium stores instructions for transmitting to the recipient computer the portion of the data structure from the source of the data structure and transmitting to the recipient computer a cached version of another portion of the transmitted data structure.

25. The computer program product according to claim 15, wherein the non-transient computer readable medium stores instructions for blocking a transmission of the data structure from a source of the data structure after an initialization of a transmission of a cached version of the portion of the data structure to the recipient computer.

26. The computer program product according to claim 25, wherein the non-transient computer readable medium stores instructions for allowing an exchange of control messages between the recipient computer and the source while blocking a transmission of the data structure.

27. An intermediate system coupled to a network that couples a source of a data structure and a recipient computer, the intermediate system comprises:
    a memory unit;
    a control sub-system that is arranged to:
        receive a portion of a data structure that is aimed to a recipient computer,
        generate a stamp that is responsive to a content of a segment of the data structure and is indifferent to transfer information about a transmission of the data structure; wherein the portion of the data structure either comprises the segment of the data structure or equals the segment of the data structure;
        determine, by the intermediate system, whether to cache the portion of the data structure in the memory unit, in response to at least a comparison between the stamp and stamps of cached portions of data structures;
        selectively cache, in the memory unit, the portion of the data structure in response to the determination; and
        transmit to the recipient computer either one of the portion of the transmitted data structure and a cached version of the portion of the transmitted data structure.

28. The intermediate system according to claim 27, wherein the control sub-system is arranged to generate the stamp while ignoring a name of the data structure.

29. The intermediate system according to claim 27, wherein the control sub-system is arranged to generate the stamp while ignoring a communication protocol header of the transmission data structure.

30. The intermediate system according to claim 27, wherein the control sub-system is arranged to select the segment of the data structure based on an expected location of at least one of a communication protocol header and a communication protocol trailer.

31. The intermediate system according to claim 27, wherein the control sub-system is arranged to search in the memory unit for stamps of cached portions of data structures, wherein the searching is responsive to size information about a size of the data structure and to size information about cached data structures.

32. The intermediate system according to claim 31, wherein the control sub-system is arranged to generate the stamp regardless of a size of the data structure.

33. The intermediate system according to claim 27, wherein the control sub-system is arranged to:
    select multiple segments of the data structure;
    generate, for each of the multiple segments of the data structure, a stamp that is responsive to a content of the segment of the data structure and is indifferent to transfer information about a transmission of the data structure; wherein the portion of the data structure either comprises the multiple segments of the data structure;
    determine, by the intermediate system, whether to cache the portion of the data structure, in response to at least a comparison between the multiple stamps and stamps of cached segments of data structures; and
    selectively cache the portion of the data structure in response to the determination.

34. The intermediate system according to claim 27, wherein the control sub-system is arranged to determine whether to cache the portion of the data structure is responsive to a frequency of requests to download the data structures.

35. The intermediate system according to claim 27, wherein the control sub-system is arranged to determine whether to cache the portion of the data structure is responsive to at least one out of (a) a cost of transmission of the data structure from a source of the data structure and (b) a speed of transmission of the data structure from the source of the data structure.

36. The intermediate system according to claim 27, wherein the control sub-system is arranged to transmit to the recipient computer the portion of the data structure from the source of the data structure and transmit to the recipient computer a cached version of another portion of the transmitted data structure.

37. The intermediate system according to claim 27, wherein the control sub-system is arranged to block a transmission of the data structure from a source of the data structure after an initialization of a transmission of a cached version of the portion of the data structure to the recipient computer.

38. The intermediate system according to claim 37, wherein the control sub-system is arranged to allow an exchange of control messages between the recipient computer and the source while blocking a transmission of the data structure.

39. A system comprising multiple intermediate entities, wherein each intermediate entity comprises:
a memory unit;
a control sub-system that is arranged to:
  receive a portion of a data structure that is aimed to a recipient computer,
  generate a stamp that is responsive to a content of a segment of the data structure and is indifferent to transfer information about a transmission of the data structure; wherein the portion of the data structure either comprises the segment of the data structure or equals the segment of the data structure;
  determine whether to cache the portion of the data structure in a memory unit of a selected intermediate entity of the multiple intermediate entities, in response to at least a comparison between the stamp and stamps of cached portions of data structures;
  participate in a caching, in the memory unit of the selected intermediate entity, the portion of the data structure in response to the determination; and
  transmit to the recipient computer either one of the portion of the transmitted data structure and a cached version of the portion of the transmitted data structure, if the selected intermediate unit is the intermediate unit that comprises the control sub-system.

40. The system according to claim 39, wherein the control sub-system is arranged to transmit to the recipient computer either one of the portion of the transmitted data structure and a cached version of the portion of the transmitted data structure, regardless of a routing of traffic from an origin server to the recipient computer.

* * * * *